(12) United States Patent
Cooprider

(10) Patent No.: US 8,549,572 B2
(45) Date of Patent: Oct. 1, 2013

(54) HAND-HELD TEST DEVICE WITH TWO TUNERS

(75) Inventor: Daniel Eugene Cooprider, Greenwood, IN (US)

(73) Assignee: JDS Uniphase Corporation, Milpitas, CA (US)

( * ) Notice: Subject to any disclaimer, the term of this patent is extended or adjusted under 35 U.S.C. 154(b) by 495 days.

(21) Appl. No.: 12/271,124

(22) Filed: Nov. 14, 2008

(65) Prior Publication Data

US 2009/0125960 A1    May 14, 2009

Related U.S. Application Data

(60) Provisional application No. 60/987,919, filed on Nov. 14, 2007.

(51) Int. Cl.
*H04N 7/173* (2011.01)
(52) U.S. Cl.
USPC .......................................... 725/107; 725/133

(58) Field of Classification Search
USPC ................. 725/105, 107, 111, 133, 141, 153; 348/180, 184, 185, 192, 193
See application file for complete search history.

(56) References Cited

U.S. PATENT DOCUMENTS

| 7,260,143 | B2 * | 8/2007 | Matsuura | 375/222 |
| 7,607,148 | B2 * | 10/2009 | Feinberg et al. | 725/22 |
| 2005/0144648 | A1 | 6/2005 | Gotwals et al. | 725/111 |
| 2006/0248572 | A1 * | 11/2006 | Kitsukama et al. | 725/135 |
| 2008/0066128 | A1 * | 3/2008 | Yun | 725/107 |

* cited by examiner

*Primary Examiner* — John Schnurr
(74) *Attorney, Agent, or Firm* — Matthew A. Pequignot; Pequignot + Myers LLC

(57) ABSTRACT

A portable network test meter device for a CATV network is disclosed which permits simultaneous operation of a measurement system including a first tuner and a communication system including a cable modem including a second tuner. Only a single RF input/output port is necessary for connection to the CATV network.

19 Claims, 2 Drawing Sheets

Hand-Held Test Device With Two Tuners

CROSS-REFERENCE TO RELATED APPLICATIONS

The present invention claims priority from U.S. Provisional Patent Application No. 60/987,919 filed Nov. 14, 2007, which is incorporated herein by reference for all purposes.

TECHNICAL FIELD

The present invention relates to a network testing device having the ability to receive two different frequencies via a single RF port for testing the network, while simultaneously communicating to another device over the RF network, and in particular to a testing device with the ability to loop back an MPEG stream from the network to a head-end device, which analyzes the data and provides a measurement result.

BACKGROUND OF THE INVENTION

Some conventional testing devices have a built-in cable modem as well as a measurement tuner, but none provide the means by which two-way communications and an accurate test measurement can take place at the same time.

United States Patent Publication No. 2005/0144648 published Jun. 30, 2005 in the name of Michael Gotwals et al. discloses a test meter having a modem and a test system, in which one tuner is shared between the cable modem and the cable test system. Thus the test meter is limited to half-duplex operation.

Some current instruments have a capability to receive and analyze a raw data stream such as a MPEG stream, but it is an expensive solution and is not very portable to the field. The present invention provides a means to capture the raw data stream and then, via two-way communication with the head-end, send back the data to be analyzed. Accordingly, the present invention provides in essence a loop-back mode via a handheld device communicating to a more expensive and high tech device in the head-end to perform an analysis of the raw data stream.

An object of the present invention is to overcome the shortcomings of the prior art by providing simultaneous data communication using a first tuner, while taking RF physical layer measurements of the network using a second tuner.

SUMMARY OF THE INVENTION

A portable network test meter for a CATV network is disclosed comprising an input/output port providing an RF connection to the CATV network; a measurement system including a first tuner for receiving a first RF signal from the input/output port and conducting tests thereon; and a communication system including a cable modem with a second tuner for sending or receiving a second RF signal simultaneously with the first RF signal via the input/output port.

A method is also described for testing an incoming data stream captured in the field from a CATV network with a handheld instrument comprising an RF input/output port, a measurement system including a first tuner, and a communication system including a cable modem with a second tuner. The incoming data stream is first captured from the CATV network through the RF input/output.

Quality tests are then conducted on the incoming data stream with the measurement system and an information data stream is sent and received between the communication system and a network node on the CATV network simultaneously with the incoming data stream via the RF input/output port.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
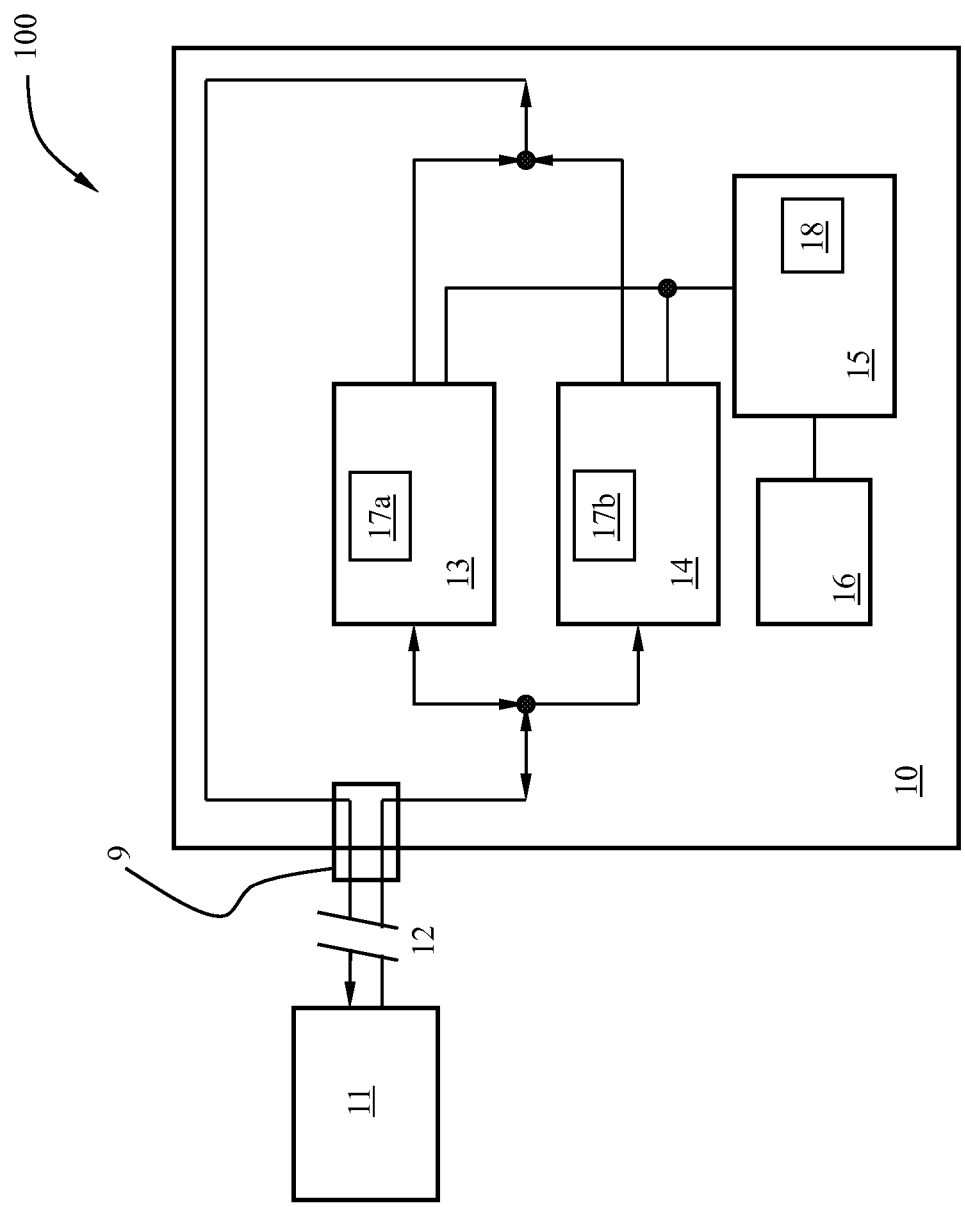
FIG. 1 is a schematic diagram of the testing device of the present invention connected to a network.

With reference to FIG. 1, the present invention relates to a test system 100 in which a portable handheld meter 10 including a means for bi-directional communication is in communication with a network node or a head-end 11 over a network 12, e.g. a cable television (CATV) network. The handheld meter 10 includes an input/output port 9, a communication system 13, e.g. a cable modem, with a first tuner 17a; a measurement system 14 with a second tuner 17b; and a digital controller 15 including memory 18 where instructions, programs such as a web browser and data are stored for controlling both the communication system 13 and the measurement system 14, e.g. a micro-controller or a digital signal processor (DSP). The digital controller 15 has a graphical user interface 16 for displaying a status of the network, results of measurements, webpage content displayed by the web browser program or similar. The present invention is targeted at CATV, but the modem can be expanded to include telecommunication networks, e.g. Very High Speed Digital Subscriber Line (VDSL).

Providing two separate tuners enables the communication system 13 using the first tuner 17a to remain in communication with remote communication equipment, e.g. two-way interaction with equipment in the head-end 11, while the measurement system 14 undertakes test and measurement activities normally expected in CATV handheld tester devices using the second tuner 17b. The first and second tuners 17a and 17b may be tuned to different frequencies or operate on different frequency channels. For example information, such as files, data, synchronization, etc., could be simultaneously exchanged with, or sent back to the head-end 11; equipment in the head-end 11 could be configured to perform something specific, so tests could be made on the network 12. Alternatively, information, e.g. owner, specifications, etc. relating to specific devices on the network 12, can be simultaneously downloaded from the head-end 11 by the communication system 13 to the digital controller 15, while at the same time the testing system 14 tests the corresponding specific devices. Tests can be automatically downloaded via the communication system 13 to the digital controller 15, run on the network 12 by the testing system 14, and then captured and/or displayed by the digital controller 15 on the hand-held meter 10.

The use of a single connector at the input/output port 9 eliminates the need to expose an unused connector of either the communication system 13 or the testing system 14 to the outside environment. Moreover, the user is no longer forced to disconnect and reconnect a test cable to whichever system is desired at the time via separate input and output ports or to use an external splitter for connectivity. The two-way control is necessary to ascertain whether shared equipment in the head-end 11 is not currently being used by another user or program, and to get information from the shared equipment in the head-end 11 about the results being sent.

The present invention provides a means of having a testing system 14 that can run independently from the communication system 13, which provides several benefits, e.g.

1) any combination of control signals can be sent from a remote location, e.g. from the head-end 11, including: start and stop information for the testing system 14; which tests are to performed from a bank of tests in the memory of the digital processor 15; and the actual tests themselves to be performed by the testing system 14;
2) faster measurements when communication is not necessary by taking advantage of the dual tuner design;
3) the output of the tuner may be interleaved so that tuning speed is not the bottleneck;
4) two-way communication can be enabled with other parts of the network while at the same time taking a measurement, so that the user can compare results from remote parts of the network 12 with the local result for troubleshooting capabilities or so that the user can compare previous results stored in remote locations, e.g. the head-end 11, with the local result.

Furthermore the present invention does not require any external connection, such as a splitter, to provide the results. The use of splitters provides another level of failure and also a hassle to the user in order to get the desired functionality.

An application of the present invention lowers the cost of analyzing signals in the field by utilizing one piece of expensive equipment at one location, e.g. the head-end 11, whereby raw data is routed back thereto via the testing device 10 for analysis.

Another benefit of the present invention is in work force management, in which a supervisor designs the tests to run and stores the tests in a remote device, e.g. in the head end 11, that technical service personnel can access simply by selecting a web-page link with the graphical user interface 16 of the hand-held device 10. In such a case the hand-held device 10 is attached to the network at a customer's premises and is associated with a specific customer. The communication system 13 of the hand-held device 10 links the web-page to the hand-held device 10, and the measurement system 14 of the hand-held device 10 is able to run the tests and store the results in the digital processor 15 and/or memory associated therewith. Accordingly, the supervisor can control what tests are done in the field and manage the resulting data.

Alternatively, the hand held unit 10 can be controlled by a supervisor remotely by contacting the digital controller 15, via the communication system 13, which instructs the measurement system 14 to proceed with testing as predetermined or selected by the supervisor from tests stored in the memory of the measurement system 14 or of the digital controller 15. As above, the tests can also be downloaded from a remote location, e.g. head-end 11 via the communication system 13, before being initiated by the measurement system 14.

Furthermore, the dual tuner system enables the hand-held device 10 to get information from the head-end 11 via the communication system 13 and simultaneously compare the information to the results seen in the field generated by the measurement system 14.

In a specific example, MPEG data collected by the measurement system 14 can be simultaneously sent back upstream by the communication system 13 to be analyzed, i.e. the hand-held device provides a loop back of a captured raw MPEG data stream to the head end 11 (or some other remote device), where the MPEG data stream can be analyzed. The graphical user interface 16 of the hand-held meter 10 may also include a data display screen or some other means for viewing the results of the signal analysis that was conducted at the head end 11, which was transmitted back to the hand-held device 10 via the communication system 13.

Figure 2:
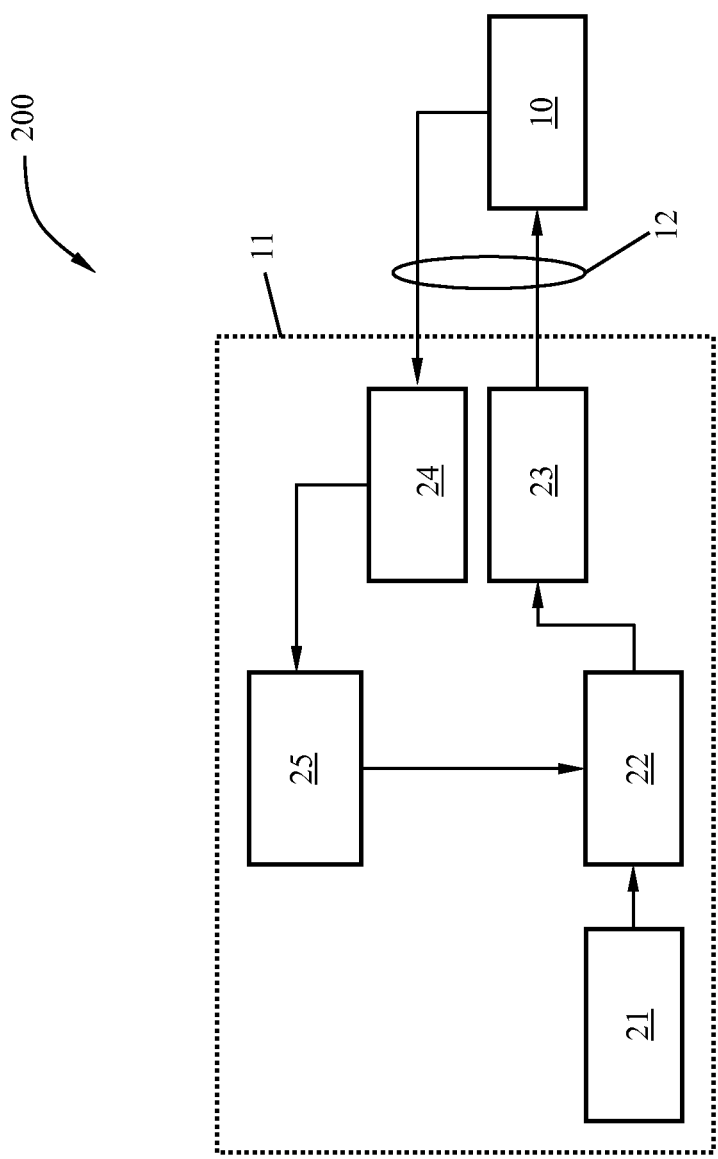
FIG. 2 is a block diagram of testing system in accordance with the present invention.

FIG. 2 illustrates an exemplary MPEG test setup where a MPEG data stream is generated at a remote location, such as the head end 11, using a MPEG generator 21, which is connected to modulator 22. Output from the modulator 22 is fed into an optical transmitter 23, which transmits a corresponding optical signal over the network 12. Handheld device 10 receives the optical signal and retransmits all or part of it ('loopback'), as determined by a test program set up in the digital controller 15, onto the network 12. At the head end 11 an optical receiver 24 receives the retransmitted optical signal and transmits it to a MPEG analyzer 25.

If sufficient bandwidth is available on the network 12 (as, for example, with a DOCSIS 3.0 feature) the entire MPEG stream can be sent back to the remote MPEG analyzer 25, at the head end 11; and then, utilizing the communication system 13 with a data-over-cable service interface specification (DOCSIS) communication channel, results of the tests on the MPEG stream can be sent back to the hand-held unit 10 and viewed with the graphical user interface 16 on the hand-held device 10 using a display format such as a web page. Accordingly, a relatively expensive testing unit, such as a DTS330, can be placed in the head-end 11 and a much less expensive meter, e.g. the hand-held unit 10, can be placed out in the field, which would collect the MPEG data stream via the measurement system 14, send the MPEG data stream back to the head-end 11 for testing via the communication system 13, and then receive results of the tests back via the communication system 13.

If the bandwidth is limited, packet identifier (PID) filtering can be performed by the digital processor 15 to limit the amount of the MPEG stream to send back to the testing equipment in the head-end 11 for analysis instead of all PIDs in a 6 MHz or 8 MHz channel. It is important to note that the MPEG-2 stream returned to the remote analyzer, e.g. MPEG analyzer 25 in the head-end 11, is a raw stream and not a stream that is recompressed, since that would be more like a Slingbox, rendering an analysis of signal integrity at the point in the network impractical.

A Slingbox is a TV streaming device that enables consumers to remotely view their cable, satellite or personal video recorder (PVR) programming from an Internet-enabled computer with a broadband internet connection. The Slingbox connects a standard or high definition TV (HDTV) source, via coaxial cable, composite cables, or S-video cable, to an existing Internet connection. Digital video recorders and cable or satellite set top boxes can be controlled through a separate infrared (IR) cable that lets users change channels from the remote location. Software on a user's personal computer (PC) connects to the Slingbox and provides a user interface for viewing the video stream and changing channels.

I claim:

1. A portable network test meter for a CATV network comprising;
    an input/output port providing an RF connection to the CATV network;
    a measurement system including a first tuner for receiving a first RF signal from the input/output port including capturing a raw RF signal from the CATV network;
    a communication system including a second tuner, separate from the first tuner, for sending or receiving a second RF signal simultaneously with the first RF signal via the input/output port, the communication system for looping back the raw RF signal to remote test equipment for analysis, and the communication system for receiving raw RF signal analysis data from the remote test equipment;
a display for displaying the raw RF signal analysis data on the test device; and
a controller for enabling simultaneous communications through the first and second tuners and the single input/output port including coordinating capturing by the measurement system, looping back and receiving the raw RF signal analysis data by the communication system, and displaying the raw RF signal analysis data.

2. The test meter according to claim 1, wherein a first frequency of the first RF signal is different from a second frequency of the second RF signal.

3. The test meter according to claim 1, wherein a head-end of the CATV network includes the remote test equipment.

4. The test meter according to claim 1, wherein a network node of the CATV network includes the remote test equipment.

5. The test meter according to claim 1, wherein the portable network test meter is comprised of a handheld instrument.

6. The system of claim 1, wherein the controller compares information received through the communication system with the raw RF signal simultaneously received through the measurement system to generate raw RF signal analysis data for display.

7. The system of claim 1, wherein the controller enables testing of the network through the first tuner while simultaneously communicating with another network device through the second tuner.

8. The system of claim 1, wherein the communication system sending or receiving a second RF simultaneously with the first RF signal enables remotely controlling the portable network test meter simultaneously with the measurement system conducting tests.

9. The portable network test meter of claim 1 further comprising the controller for performing packet identifier (PID) filtering to decrease the bandwidth required for looping back the incoming data stream.

10. A method of testing an incoming data stream captured in the field from a CATV network with a handheld instrument comprising an RF input/output port, a measurement system including a first tuner, and a communication system including a second tuner, separate from the first tuner, the method comprising:
capturing the incoming data stream from the CATV network through the RF input/output, including capturing a raw RF signal;
conducting quality tests on the incoming data stream;
sending or receiving an information data stream between the communication system and a network node on the CATV network simultaneously with the capturing, including looping back the raw RF signal from the handheld instrument to the network node and receiving raw RF signal analysis data from the network node;
displaying the analysis data on the handheld instrument; and
controlling the simultaneous capturing and sending or receiving including coordinating capturing by the measurement system, looping back and receiving the analysis result by the communication system, and displaying the stream analysis data.

11. The method of claim 10, wherein a first frequency of the incoming data stream is different from a second frequency of the information data stream.

12. The method of claim 10, wherein the incoming data stream and the information data stream comprises a MPEG stream.

13. The method of claim 10, wherein the network node comprises a head-end of the CATV network.

14. The method of claim 13, further comprising analyzing raw video data from the information data stream at the head-end thereby generating stream analysis data at the head-end, and transmitting stream analysis data from the head-end to the handheld instrument via the information data stream.

15. The method of claim 13, wherein the information data stream comprises one or more of files, data, and synchronization.

16. The method of claim 10, wherein the handheld instrument further comprises a digital controller, the method further comprising downloading one or more of owner data, specifications, and test configuration data from the network node using the digital controller via the information data stream.

17. The method of claim 10 further comprising: the handheld instrument comparing information received through the communication system with the incoming data stream simultaneously received through the measurement system to generate further stream analysis data for display on the handheld instrument.

18. The method of claim 10 further comprising remotely controlling the handheld instrument through the sending or receiving of the information data stream between the communication system and the network node on the CATV network simultaneously with the capturing.

19. The method of claim 10 further comprising performing packet identifier (PID) filtering to decrease the bandwidth required for looping back the incoming data stream.

* * * * *